E. OLSSON.
HYDRAULIC BRAKE FOR GUNS WITH RECOILING BARRELS.
APPLICATION FILED NOV. 12, 1909.
997,411.
Patented July 11, 1911.
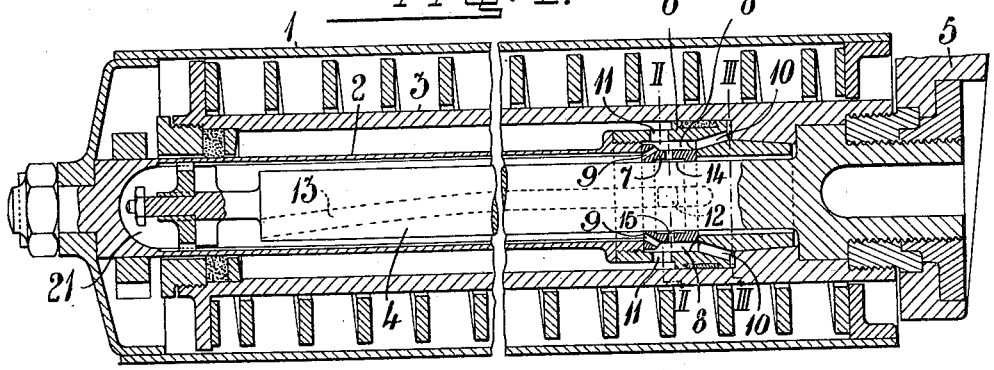
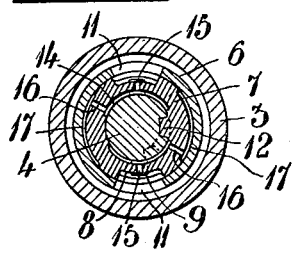
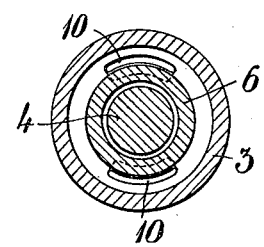
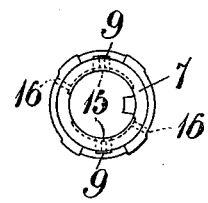
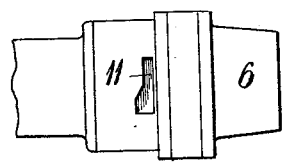
WITNESSES
INVENTOR
Emil Olsson

UNITED STATES PATENT OFFICE.

EMIL OLSSON, OF BOFORS, SWEDEN.

HYDRAULIC BRAKE FOR GUNS WITH RECOILING BARRELS.

997,411.  Specification of Letters Patent.  Patented July 11, 1911.

Application filed November 12, 1909. Serial No. 527,676.

*To all whom it may concern:*

Be it known that I, EMIL OLSSON, chief engineer, a subject of Sweden, residing at Bofors, Sweden, have invented new and useful Improvements in Hydraulic Brakes for Guns with Recoiling Barrels, of which the following is a specification.

The present invention relates to an arrangement in such hydraulic brakes for guns with recoiling barrel, which are provided with a hollow piston rod and a controlling rod embraced by the same, and where the braking liquid during the elevation partly flows over from one side of the piston to the other, partly is introduced in the interior space of the piston rod, and where the passage areas are controlled by means of a valve rotated during the recoil by the influence of suitable controlling means provided in the controlling rod.

The characteristic feature of the invention is, that the said valve is arranged in the interior of the piston around the controlling rod, and that the admission of liquid to the valve takes place through radial (*i. e.* perpendicular to the longitudinal direction of the brake) ports arranged around the periphery of the piston. The valve is so arranged, that it permits the adjusting of the brake either by hand or automatically in elevating the gun for obtaining suitable recoil length. By the arrangement of the liquid ports the valve is balanced, but if wanted, an additional means described below may serve to reduce the friction at the movement of the valve and distribute the liquid pressures acting on the valve so as to compensate each other.

A form of the invention is illustrated in the accompanying drawing, where—

Figure 1 shows a recoil brake in a vertical longitudinal section, Figs. 2 and 3 cross sections on the lines II—II and III—III respectively in Fig. 1, Fig. 4 an end view of the valve member and Fig. 5 a side view of the brake piston.

The brake piston 6 is by means of the piston rod 2 rotatably, but not lengthwise movably connected with the cradle 1, while the brake cylinder 3 and the controlling rod 4 plunging into the interior space 21 of the piston rod are rigidly connected to the lug 5 of the gun barrel. Inside the piston 6 the annular valve member 7 serving to control the passage of the braking liquid is arranged around the controlling rod 4 and provided with a guiding projection 12 engaging a suitably curved groove 13 in the said controlling rod. In the drawing, only one projection 12 and one groove 13 are shown, but of course several can be used. The valve member 7 is provided with symmetrically placed, longitudinal grooves 8 adapted to make constant communication with ports 10 in the end wall of the piston opposed to the piston rod and intermittent communication, depending upon the mutual angular position between the valve member (*i. e.* between the controlling rod) and the piston with suitable shaped, symmetrically arranged radial ports 11 in the piston. From the grooves 8 oblique inwardly directed ports 9 lead to the interior space 21 of the piston rod. During the recoil the valve thus admits the liquid from the cylinder space surrounding the piston rod to the opposite cylinder space and also to the interior space of the piston rod. During the counter-recoil the liquid flows in the opposite direction. By the symmetrical arrangement of the grooves 8 and the ports 11 the liquid pressures acting radially on the valve member will counteract each other, the valve thus becoming balanced.

In addition to the holes or ports now described the valve member is provided with other recesses and ports adapted to provide a still more perfect balancing and to prevent deformations under pressure. The longitudinal grooves 8 are thus connected, by means of radial ports 15, with shallow recesses 14 on the inside of the valve member, said recesses being in turn connected with similar ones 17 on the outside by means of ports 16. The recesses 14 and 17 are so arranged, that the valve member is exposed during the braking to a rather uniform liquid pressure, deformation of the same and rubbing or cutting against the controlling rod caused thereby thus being prevented. The groove 13 in the controlling rod, the curvature of which will determine the gradual closing of the valve, whereby the recoil is checked, is in its first portion preferably straight, so that the rotation of the valve will not begin until the liquid pressure caused by the recoil has been transmitted through all the recesses and ports 14—17.

Having now particularly described and ascertained the nature of my said invention, and in what manner the same is to be performed, I declare that what I claim is:

1. A hydraulic brake for artillery guns with recoiling barrel, comprising, in combination, a brake cylinder, a piston, a hollow piston rod, a controlling rod embraced by said piston and piston rod, an annular valve arranged in said piston and embracing said controlling rod, guiding means in said controlling rod for rotating said valve during the recoil, radial ports arranged symmetrically along the periphery of said piston for admitting liquid from one end of said brake cylinder to the valve, axial ports in said piston for admitting liquid from the valve to the other end of said brake cylinder during the recoil, and axial ports in said valve for admitting liquid into the interior of the hollow piston rod during the recoil.

2. A hydraulic brake for artillery guns with recoiling barrel, comprising, in combination, a brake cylinder, a piston, a hollow piston rod, a controlling rod embraced by said piston and piston rod, an annular valve arranged in said piston and embracing said controlling rod, said valve being rotated during the recoil by guiding means in the controlling rod and serving to control, by means of ports, the admission of liquid from one end of the brake cylinder to the other and also into the interior of the hollow piston rod, shallow recesses in the inner and outer working surfaces of said valve, and ports connecting said recesses to each other and to the controlling ports of the valve.

3. A hydraulic brake for artillery guns with recoiling barrel, comprising, in combination, a brake cylinder, a piston, a hollow piston rod, a controlling rod embraced by said piston and piston rod, an annular valve arranged in said piston and embracing said controlling rod, means on said valve engaging curved guiding means in said controlling rod for rotating the valve during the recoil, radial ports symmetrically arranged in said piston and registering more or less completely with grooves in the external periphery of the valve according to the rotation of said valve during the recoil, axial ports in said piston communicating with said grooves in the valve and axial ports in said valve connecting its grooves with the interior of the hollow piston rod.

In testimony whereof I have signed my name to this specification in the presence of two subscribing witnesses.

EMIL OLSSON.

Witnesses:
BIRGER NORDFELDT,
H. TELANDER.